US010880743B1

(12) United States Patent
Berzin et al.

(10) Patent No.: US 10,880,743 B1
(45) Date of Patent: Dec. 29, 2020

(54) INTERCONNECTION AND ACTIVATION FOR INTERNET OF THINGS DEVICES IN MULTI-TENANT DATA CENTER FACILITIES

(71) Applicant: Equinix, Inc., Redwood City, CA (US)

(72) Inventors: Oleg Berzin, Huntingdon Valley, PA (US); Imam Sheikh, Redwood City, CA (US); Doron Hendel, Redwood City, CA (US)

(73) Assignee: EQUINIX, INC., Redwood City, CA (US)

( * ) Notice: Subject to any disclaimer, the term of this patent is extended or adjusted under 35 U.S.C. 154(b) by 268 days.

(21) Appl. No.: 16/000,144

(22) Filed: Jun. 5, 2018

(51) Int. Cl.
| | |
|---|---|
| *H04W 12/06* | (2009.01) |
| *H04L 12/24* | (2006.01) |
| *H04L 29/08* | (2006.01) |
| *H04L 29/06* | (2006.01) |
| *H04W 12/04* | (2009.01) |

(52) U.S. Cl.
CPC ......... *H04W 12/06* (2013.01); *H04L 41/0806* (2013.01); *H04L 63/062* (2013.01); *H04L 63/08* (2013.01); *H04L 67/141* (2013.01); *H04W 12/04* (2013.01); *H04L 63/0428* (2013.01)

(58) Field of Classification Search
CPC ...... H04W 12/06; H04W 12/04; H04L 63/08; H04L 41/0806; H04L 63/062; H04L 67/141; H04L 63/0428
See application file for complete search history.

(56) References Cited

U.S. PATENT DOCUMENTS

| | | | |
|---|---|---|---|
| 9,886,267 B2 | 2/2018 | Maheshwari | |
| 9,948,552 B2 | 4/2018 | Teng et al. | |
| 10,015,268 B2 | 7/2018 | Rao | |
| 2018/0376318 A1* | 12/2018 | Wang | H04W 8/04 |
| 2019/0045412 A1* | 2/2019 | Shivam | H04W 28/08 |
| 2019/0207755 A1* | 7/2019 | Gu | H04W 4/70 |
| 2019/0222569 A1* | 7/2019 | Willis | G06F 8/65 |
| 2019/0306242 A1* | 10/2019 | Thummalapalli | H04L 67/10 |
| 2019/0349426 A1* | 11/2019 | Smith | H04L 67/104 |

OTHER PUBLICATIONS

Towner, "How IoT Data Collection and Aggregation with Local Event Processing Work," InterConnections—The Equinix Blog, Nov. 29, 2017, 5 pp.

* cited by examiner

Primary Examiner — Alexander Lagor
Assistant Examiner — Quazi Farooqui
(74) Attorney, Agent, or Firm — Shumaker & Sieffert, P.A.

(57) ABSTRACT

Techniques are described for a centralized, neutral system for Internet of Things (IoT) device activation and automatic onboarding on an end-to-end basis, and for establishing secure communication between IoT devices and the IoT platforms. For example, a method includes receiving an activation request message from an IoT device to activate the IoT device on an IoT core network of a plurality of IoT core networks, wherein the plurality of IoT core networks and a plurality of IoT edge devices are co-located within the co-location facilities, and wherein the plurality of IoT edge devices are connected to one or more IoT platforms; authenticating the IoT device for connection to the IoT core network; and in response to authenticating the IoT device, provisioning a connection between the IoT core network and the plurality of IoT edge devices to provide the IoT device access to the one or more IoT platforms.

20 Claims, 7 Drawing Sheets

INTERCONNECTION AND ACTIVATION FOR INTERNET OF THINGS DEVICES IN MULTI-TENANT DATA CENTER FACILITIES

TECHNICAL FIELD

The disclosure relates to computer networks and, more specifically, to interconnecting computer networks.

BACKGROUND

A network services exchange provider or co-location provider (a "provider") may employ a communication facility, such as a data center or warehouse, in which multiple customers of the provider locate network, server, and storage gear and interconnect to a variety of telecommunications and other network service provider(s) with a minimum of cost and complexity. Data centers may be shared by the multiple tenants having their networking equipment located within the data centers. With Information Technology (IT) and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

In some examples, the communication facility provides interconnection services by which customers of the provider may interconnect to one another over the communication facility infrastructure or by which a customer of the provider may interconnect its spatially and/or geographically distributed customer networking equipment over the communication facility infrastructure. The communication facility may in such cases be referred to as an "interconnection facility" or "co-location facility."

Enterprises are increasingly making use of "smart" devices, i.e., physical objects that contain embedded technology configured to provide some degree of computing intelligence. These smart devices may communicate and sense or interact with their internal states or the external environment. The "Internet of Things" (IoT) refers to a network of these smart devices ("IoT devices"). The number of connected IoT devices is increasing exponentially, leading to various technology challenges for an enterprise attempting to integrate IoT implementations with the enterprise's centralized computing architecture for Information Technology (IT) systems and cloud ecosystem. These technology challenges may include scalability, performance, interoperability, security, and privacy, for example.

SUMMARY

In general, techniques are described for a centralized, neutral system for Internet of Things (IoT) device activation and automatic onboarding on an end-to-end basis between IoT core networks and IoT platforms, and for establishing secure communication between IoT devices and the IoT platforms.

As one example, techniques described herein may provide for an interconnection system having a device activation unit that provides IoT device supply chain management. The device activation unit may provide a centralized, neutral system for providers of IoT platforms and device manufacturers to exchange device provisioning and security credential data in a systematic and scalable manner for batch device provisioning in both IoT core networks and IoT platforms.

As another example, the device activation unit provides IoT device activation and automatic onboarding. For example, providers of IoT platforms may deploy, within co-location facilities, IoT core network software that controls and manages aspects of IoT device communications for an access network, including security and data routing. Co-location facilities may further deploy IoT edge devices (e.g., gateways) that enable IoT platforms to distribute IoT intelligence, connectivity, event processing and analytics to the IoT devices via one or more core networks co-located within the co-location facilities. By interconnecting IoT core networks and the edge devices within the co-location facilities, the device activation unit may activate IoT devices within one or more core networks and automatically onboard the activated IoT devices on the IoT platforms. That is, an IoT device authenticated on a core network is also automatically onboarded into one or more IoT platforms (i.e., to create many-to-many relationships between cloud service providers, IoT device manufacturers, and network providers).

As another example, the device activation unit provides secure end-to-end communication between IoT devices and IoT platforms. The device activation unit may establish a secure end-to-end communication session between IoT devices and IoT platforms by generating session keys and sharing the session keys to core networks and edge devices coupled to IoT platforms, and sending an authentication response to the activated IoT devices including information for which the activated IoT devices may generate a session key that matches the session keys in the core networks and the edge devices.

Moreover, the techniques described herein may also provide for facilitating a build-out of the IoT network (e.g., "last mile" connectivity) in response to customer demand for network coverage. For example, if an IoT customer deploys an IoT application in the Cloud IoT platform, the system described herein determines that there is a lack of network coverage (e.g., Low Power Wide Area Network (LoRaWAN)) in a particular location where an IoT device (e.g., a sensor) is to be installed. In response, the system may alert the IoT network provider to deploy wireless gateways or access points (e.g. LoRaWAN Gateway) to provide network coverage for the particular location.

In this way, the techniques described in this disclosure may provide one or more technical advantages. For example, the example systems described herein may provide a neutral, multi-network, IoT device activation and onboarding service with inter-roaming capabilities that is secure and scalable. In some instances, the techniques may enable secure application sessions between IoT devices and the IoT edge devices without requiring certificate exchange, storage, or query by the IoT devices. For example, the techniques may include an activation procedure that integrates the application session activation and network session activation to exploit the network security procedure for an interconnection and use the results to activate the application session with the IoT platform. Moreover, facilitating a buildout of the IoT network in a particular location may provide access of a newly available network in and around the particular location for all other customers. Consequently, the techniques may be particularly applicable to low cost, low power IoT devices that seek economies in power consumption and computation resource utilization by eschewing complex certificate-based authentication schemes. In one example, a method includes receiving, by a device activation unit of one or more co-location facilities, an activation request message from an Internet of Things (IoT) device to activate the IoT device on an IoT core network of a plurality of IoT core networks, wherein the plurality of IoT core networks and a plurality of IoT edge devices are co-located within the co-location facilities that are deployed and managed by a co-location facilities provider, and wherein the plurality of IoT edge devices are connected to one or more IoT platforms. The method also includes authenticating, by the device activation unit, the IoT device for connection to the IoT core network of the plurality of IoT core networks. The method further includes, in response to authenticating the IoT device, provisioning, by the device activation unit, a connection between the IoT core network of the plurality of IoT core networks and the plurality of IoT edge devices to provide the IoT device access to the one or more IoT platforms.

In another example, a system includes a plurality of Internet of Things (IoT) edge devices co-located within respective co-location facilities each deployed and managed by a single co-location facility provider, wherein at least one of the plurality of IoT edge devices is communicatively coupled to one or more IoT platforms. The system also includes a plurality of IoT core networks co-located within one or more co-location facilities each deployed and managed by the single co-location facility provider, wherein at least one of the plurality of IoT core networks is communicatively coupled to an IoT device of a plurality of IoT devices. The system further includes a device activation unit, wherein the device activation unit is configured to receive an activation request message from the IoT device to activate the IoT device on an IoT core network of the plurality of IoT core networks, authenticate the IoT device for connection to the IoT core network of the plurality of IoT core networks, and in response to authenticating the IoT device, provision a connection between the IoT core network of the plurality of IoT core networks and the plurality of IoT edge devices to provide the IoT device access to the one or more IoT platforms.

In a further example, a computer readable storage medium comprising instructions that when executed cause one or more processors of a computing system to: receive an activation request message from the IoT device to activate an Internet of Things (IoT) device on an IoT core network of the plurality of IoT core networks, authenticate the IoT device for connection to the IoT core network of the plurality of IoT core networks; and in response to authenticating the IoT device, provision a connection between the IoT core network of the plurality of IoT core networks and the plurality of IoT edge devices to provide the IoT device access to the one or more IoT platforms.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1A:
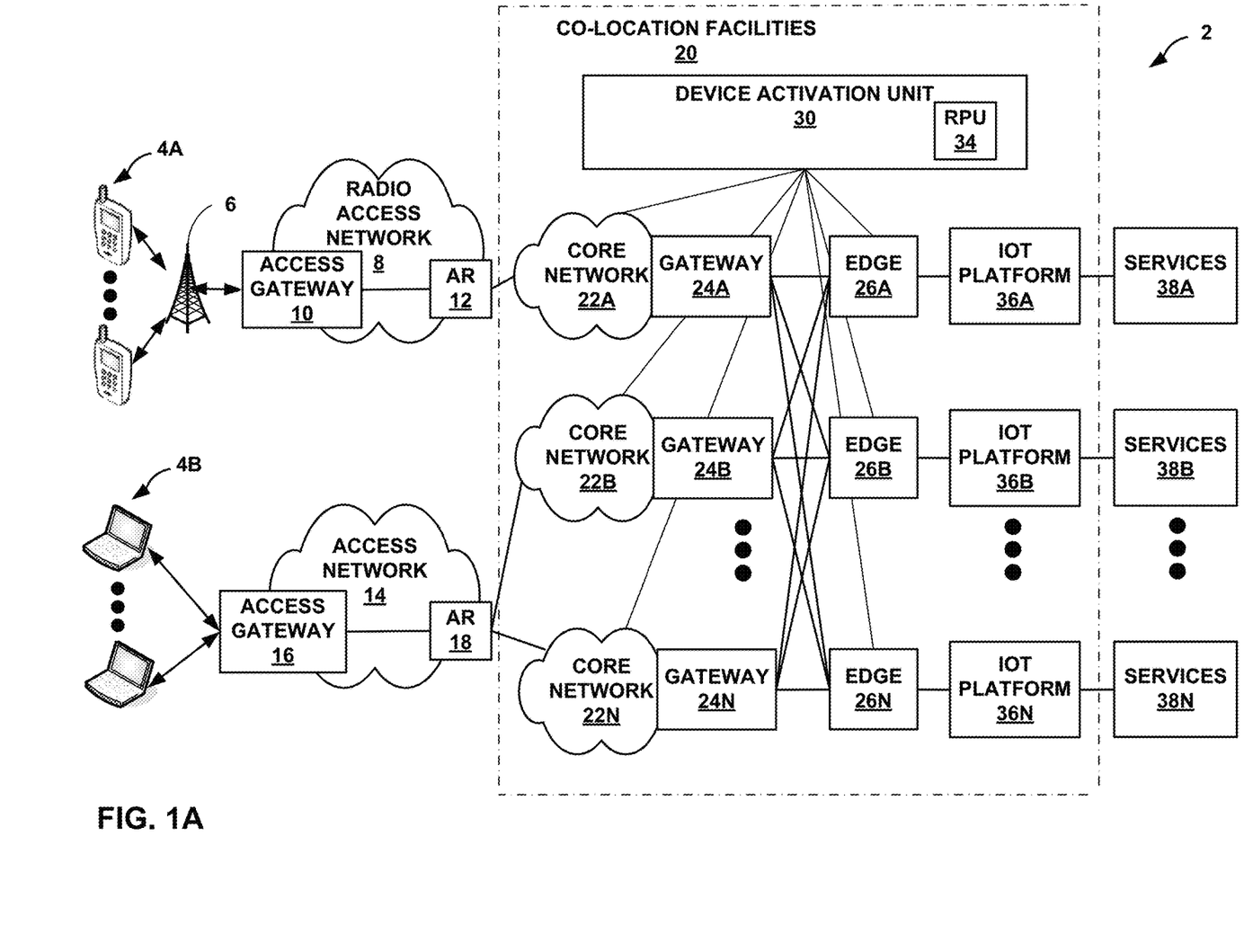
FIG. 1A is a block diagram illustrating an example system, in accordance with techniques described herein.

FIG. 1A is a block diagram illustrating an example network system 2 for providing Internet of Things (IoT) device activation and interconnection, in accordance with the techniques described herein. In the example of FIG. 1A, network system 2 includes one or more co-location facilities 20 that provides seamless activation and automatic onboarding of IoT devices 4A, 4B (collectively, "IoT devices 4" or "devices 4") to IoT platforms 36A-36N (collectively, or "IoT platforms 36") and establishes secure end-to-end communication between IoT devices 4 and IoT platforms 36 such that IoT devices 4 may access IoT services 38A-38N (collectively, "services 38") from various of the IoT platforms 36.

IoT devices 4 may be any of a variety of smart devices. In some examples, IoT devices 4 may be personal computing devices, such as smart phones, tablets, smart watches, laptop computers, desktop computers, e-readers, or other computing devices. In some examples, the IoT devices 4 may include devices of the home consumer, such as light bulbs, kitchen utensils, security devices, pet feeding devices, irrigation controllers, smoke alarms, entertainment units, infotainment units, energy monitoring devices, thermostats, and home appliances such as refrigerators, washers, dryers, stoves, for example. As another example, the IoT devices 4 may include devices for transport and mobility, such as devices for traffic routing, telematics, package monitoring, smart parking, insurance adjustments, supply chain, shipping, public transport, airlines, and trains, for example. As another example, the IoT devices 4 may include devices for buildings and infrastructure, such as devices for HVAC, security, lighting, electrical, transit, emergency alerts, structural integrity, occupancy, energy credits, for example. As another example, the IoT devices 4 may include devices for cities and industry, such as devices for electrical distribution, maintenance, surveillance, signage, utilities, smart grid, emergency services, and waste management, for example. In some examples, IoT devices 4 include sensors, such as for sensing conditions of the surrounding environment.

As shown in FIG. 1A, network system 2 may include a radio access network 8 with an access gateway 10 and access router 12 that provide IoT devices 4A with access to one or more of IoT core networks 22A-22N (collectively, "core networks 22"). For example, IoT devices 4A may support both cellular radio access and local wireless networks (e.g., WiFi) and may communicate with base station 6 over wireless links to access radio access network 8. Radio access network 8 may provide network access, data transport and other services to IoT devices 4A. Radio access network 8 may implement a cellular network architecture, such as a cellular network architecture defined by Global System for Mobile communication (GSM) Association, the $3^{rd}$ Generation Partnership Project (3GPP), the 3$^{rd}$ Generation Partnership Project 2 (3GPP/2), the 3$^{rd}$ Generation Partnership Project Machine Type Communication (3GPP MTC), the Internet Engineering Task Force (IETF), and the Worldwide Interoperability for Microwave Access (WiMAX) forum. For example, radio access network 8 may represent a radio network of a GSM architecture, a General Packet Radio Service (GPRS) architecture, a Universal Mobile Telecommunications System (UMTS) architecture, and an evolution of UMTS referred to as Long Term Evolution (LTE), each of which is standardized by 3GPP. Alternatively, or in conjunction with one of the above, radio access network 8 may implement code division multiple access (CDMA) architecture. Radio access network 8 may, alternatively, or in conjunction with one of the above, implement a WiMAX architecture. In some examples, radio access network 8 may implement low power cellular network architecture, such as Extended Coverage GSM (EC-GSM), LTE for Machines (LTE-M), and Narrowband IoT (NB-IoT). A low power network wide area network (otherwise referred to as "LPWAN") may provide long range wireless connectivity, enable very long device battery life and very low cost devices (e.g., sensors and monitors), provide the ability to activate devices securely and automatically (e.g., via over-the-air (OTA)).

Network system 2 may also include an access network 14 with an access gateway 16 and access router 18 that provide IoT devices 4B with access to one or more core networks 22. For example, each of IoT devices 4B may communicate with access gateway 16 over a physical interface for access to access network 14. For example, IoT devices 4B may utilize a Point-to-Point Protocol (PPP), such as PPP over Asynchronous Transfer Mode (ATM) or PPP over Ethernet (PP-PoE), to communicate with access gateway 16. Other examples may use other lines besides DSL lines, such as cable, Ethernet over a T1, T3 or other access links. In some examples, access network 14 may implement low power non-cellular network architecture, such as LoRa, Sigfox, and Random Phase Multiple Access (RPMA).

IoT devices 4 may use services 38 provided by IoT platforms 36. IoT platforms 36 may each comprise a private or public cloud, an enterprise, or the like. IoT platforms 36 provide, for example, IoT intelligence, data analytics, device management and provisioning, data management, connectivity, event processing, and API controls to IoT devices 4. For instance, IoT platforms 36 may provide access to IoT services 38 that include, for example, consumer, industrial, smart city, and/or vehicular applications. In some examples, platforms 36 are co-located within co-location facilities 20. In some examples, platforms 36 are external to co-location facilities 20.

In the example of FIG. 1A, IoT devices 4 may connect to co-location facilities 20 to access services 38 provided by IoT platforms 36. A co-location facility provider may employ one or more co-location facilities, e.g., co-location facilities 20, such as a data center or warehouse, in which multiple customers of the co-location facility provider may locate network, server, storage gear and interconnect to a variety of telecommunications, cloud, and other network service provider(s) with a minimum of cost and complexity. Each of co-location facilities 20 may have a switch fabric (not shown) configurable for cross-connecting customer networks located within multiple customer cages. In some instances, the customer cages may each be associated with a different customer of the interconnection system provider. As used herein, the term "customer" of the interconnection system provider may refer to a tenant of the co-location facilities 20 deployed by the co-location facility provider, whereby the customer leases space within the co-location facilities 20 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. Co-location facilities 20 may operate a network services exchange, such as Ethernet Exchange, and Internet Exchange, and/or a Cloud Exchange, for example, to transmit L2/L3 packet data between customer networks. Co-location facilities 20 may provide both an Ethernet exchange and a cloud-based services exchange, in some examples.

Further example details of a facility that provides a cloud-based services exchange are found in U.S. Ser. No. 15/099,407, filed Apr. 14, 2016 and entitled "Cloud-Based Services Exchange"; U.S. Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE"; and in U.S. Provisional Patent Application 62/160,547, filed May 12, 2015 and entitled "PROGRAMMABLE NETWORK PLATFORM FOR A CLOUD-BASED SERVICES EXCHANGE"; each of which are incorporated herein by reference in their respective entireties.

In accordance with the techniques of this disclosure, co-location facilities 20 may provide a centralized, neutral IoT device activation and automatic onboarding service on an end-to-end basis between core networks 22 and IoT platforms 36. In the example of FIG. 1A, co-location facilities 20 may include core networks 22 and IoT edge devices 26A-26N (collectively, "edge devices 26") co-located within co-location facilities 20. For example, providers of IoT platforms 36 may deploy core software as virtualized network functions running on a Network Functions Virtualization Infrastructure (NFVI) provided by co-location facilities 20 or an operator-owned NFVI. Core networks 22 manage all aspects of device communications on the network including security and data routing between IoT devices 4 and IoT platforms 36. For example, core networks 22 may control, manage, and provide access and connectivity for access networks (e.g., radio access network 8) and IoT devices 4 making use of these access networks. Core networks 22 may include a Low Power Wide Area Network (LPWAN), Random Phase Multiple Access (RPMA) network, Sigfox wireless network, cellular network, Ethernet networks, or the like.

Edge devices 26 may also be deployed in co-location facilities 20 to provide device connectivity functions (e.g., protocol and messaging adaptation), processing (e.g., event processing), streaming analytics and security, customer segmentation and interface to IoT platforms 36. Edge devices 26 may implement, for example, Azure IoT Edge technologies, Amazon Web Services (AWS) Greengrass technologies, or the like.

Core networks 22 are connected to edge devices 26 within co-location facilities 20. For example, edge devices 26 are connected via the switch fabric within co-location facilities 20 and the physical and virtual circuits to IoT platforms 36. Edge devices 26 can leverage the capabilities of the co-location service provider in the areas of co-location, interconnection, and access to a variety of different IoT platforms 36 that are also customers of the co-location facility provider, to provide an interconnection architecture in which edge devices 26 may access multiple core networks 22 of the same or different kinds. In some examples, edge devices 26 may analyze traffic data communicated to IoT platforms 36 to influence billing decisions.

In the example of FIG. 1A, co-location facilities 20 may provide a centralized system that provides IoT device supply chain management, IoT device activation and automated onboarding service, and end-to-end secure communication between core networks 22 and IoT platforms 36.

As one example, co-location facilities 20 may include at least one Device Activation Unit 30 ("DAU 30") that provides IoT device supply chain management by allowing providers of IoT platforms 36 and device manufacturers (not shown) to exchange IoT device provisioning and security credential data. For example, DAU 30 may receive authentication information, e.g., root keys, device identifiers, application identifiers, etc., from providers of IoT platforms 36. Device manufacturers may retrieve the authentication information from DAU 30 and configure IoT devices 4 based on the authentication information. By storing the authentication information in DAU 30, DAU 30 may activate the IoT devices in bulk unlike edge devices that activate IoT devices individually.

DAU 30 may provide an IoT device activation and automatic onboarding service on an end-to-end basis between core networks 22 and IoT platforms 36. For example, DAU 30 may activate IoT devices 4 based on the authentication information stored in DAU 30. In response to activating IoT devices 4, DAU 30 may share information of the activated IoT device 4 to edge devices 26 and/or IoT platforms 36 to enable integrated device activation in IoT platforms 36 when the device activates in core networks 22. In some examples, DAU 30 may include a roaming policy unit 34 ("RPU 34") that implements roaming policies between core networks 22 and edge devices 26. In response, RPU 34 may instantiate forwarding rules into the interconnection fabric of co-location facilities 20 to allow IoT device traffic to flow between core networks 22 and edge devices 26. Although RPU 34 is illustrated as included in DAU 30, RPU 34 may be external to DAU 30.

DAU 30 may also establish secure end-to-end communication between IoT devices 4 and IoT platforms 36. For example, DAU 30 may establish a secure communication session between the IoT devices 4 and IoT platforms 36. The secure communication session may include Message Queueing Telemetry Transport (MQTT), MQTT for Sensor Networks (MQTT-SN), Transport Layer Security (TLS), Datagram Transport Layer Security (DTLS), Advanced Message Queuing Protocol, Constrained Application Protocol (CoAP), Extensible Messaging and Presence Protocol (XMPP), Web sockets, Hyper-Text Transfer Protocol 2 (HTTP2), Secure Sockets Layer (SSL), Transmission Control Protocol (TCP), for example. As further described below, DAU 30 may generate a session key based on information (e.g., identifiers, security keys, etc.) included in the activation request from IoT devices 4. DAU 30 may share the session key with core networks 22 and edge devices 26. By sharing the session key with core networks 22 and edge devices 26, core networks 22 and edge devices 26 may accept encrypted communication from IoT devices 4 with a matching session key.

DAU 30 may also send an activation response to IoT devices 4 including information for which IoT devices 4 may generate a session key that matches the session key of core networks 22 and edge devices 26. In this way, traffic from IoT devices 4 may establish secure communication through the switch fabric of co-location facilities 20 to IoT platforms 36.

DAU 30 may also maintain network coverage (e.g., "last mile" coverage) information on a per IoT network provider basis to automatically alert network providers if there is a lack of, or insufficient, network (e.g., wireless) coverage in specific geographic locations causing failures in connectivity or activation of IoT devices 4. To alert network providers, geographic location information (e.g., where a given IoT device needs to be deployed) may be included in the device onboarding/provisioning information along with device and application identification information. In this case, DAU 30 can compare the network coverage information with the requested device location information and determine if there is network coverage in the requested location. If there is no sufficient coverage, DAU 30 may alert one or more network providers and trigger deployment of wireless gateways (e.g., access gateways/points) in order to provide the network coverage. Once the coverage is provided for the initial requesting device, all other IoT devices 4 may access the newly deployed access gateway will be able to use the IoT access network (e.g., radio access network 8).

Figure 1B:
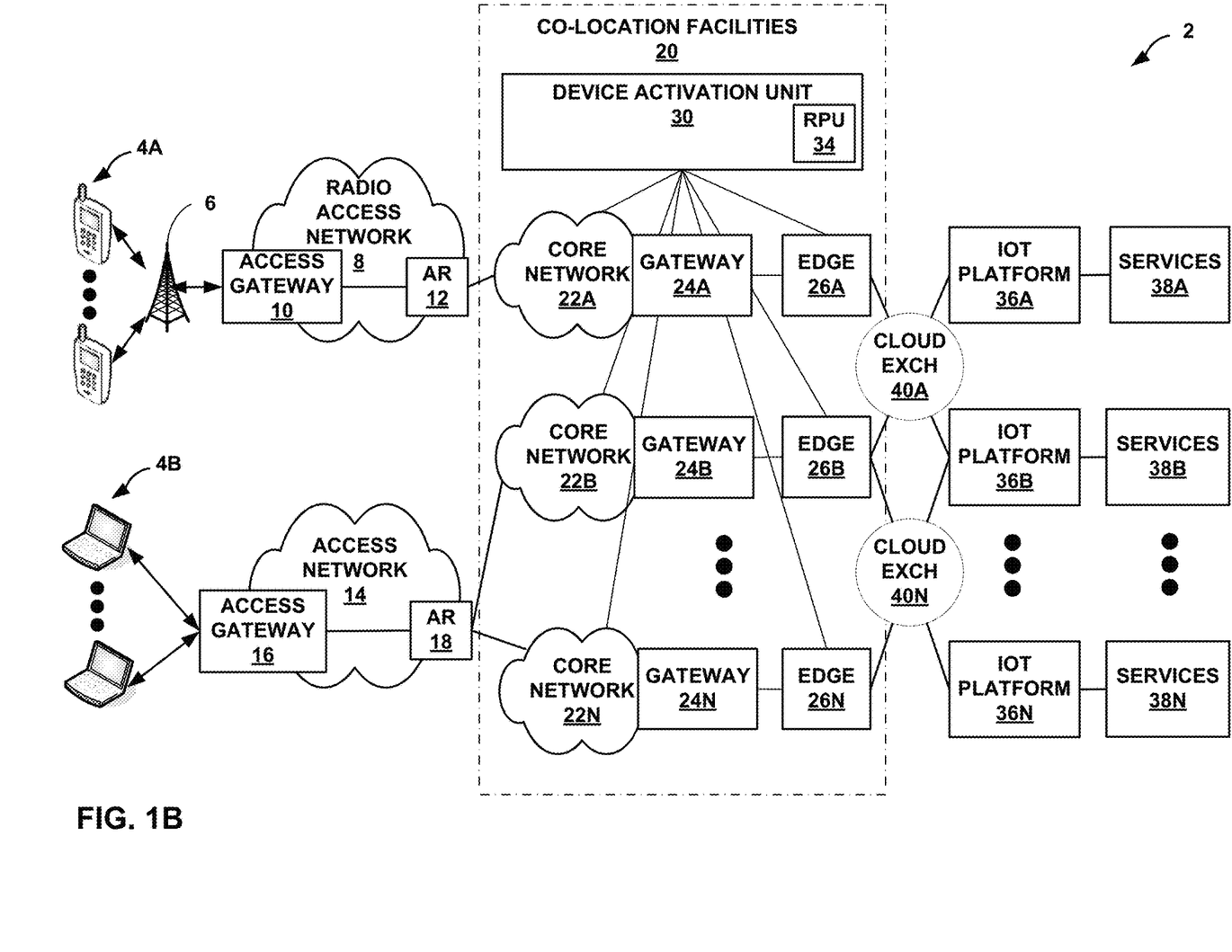
FIG. 1B is a block diagram illustrating an example system, in accordance with techniques described herein.

FIG. 1B is a block diagram illustrating another example system for providing an interconnected system for IoT device provisioning and secure communication, in accordance with techniques described herein. System 2 of FIG. 1B is similar to system 2 of FIG. 1A except as described below.

In the example of FIG. 1B, co-location facilities 20 may include one or more cloud based services exchanges 40A-40N (collectively, "cloud exchanges 40") for interconnecting IoT platforms 36 with edge devices 26. For example, cloud exchanges 40 each includes a network infrastructure that provides an L2/L3 switching fabric by which IoT platforms 36 and edge devices 26 interconnect. The network infrastructure may include network devices, such as routers, switches, software defined networking (SDN) controllers, network management systems, provisioning systems, or the like, to provide the interconnection of customers/carriers. This enables a carrier/customer to have options to create many-to-many interconnections with only a one-time hook up to the switch fabric and underlying interconnection platform of cloud exchanges 40. In other words, instead of having to establish separate connections across transit networks to access different IoT platforms, cloud exchanges 40 allows IoT devices 4 to access one or more IoT platforms 36 using the network infrastructure within co-location facilities 20.

Figure 2:
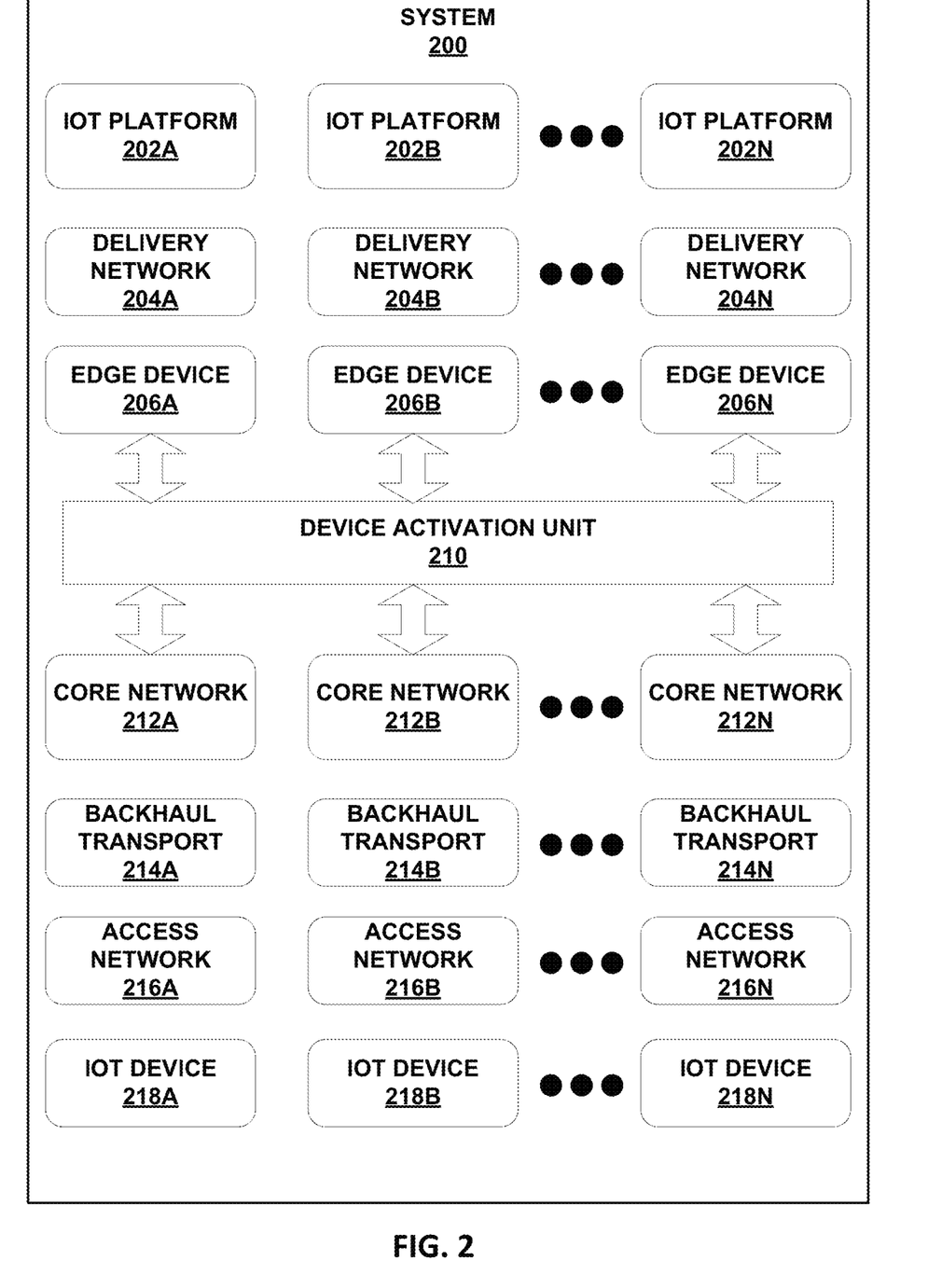
FIG. 2 is a block diagram illustrating an example system, in accordance with the techniques described herein.

FIG. 2 is a block diagram illustrating an example system 200, in accordance with the techniques described herein. In the example of FIG. 2, system 200 may include IoT platforms 202A-202N (collectively, "IoT platforms 202"), delivery networks 204A-204N (collectively, "delivery networks 204"), edge devices 206A-206N (collectively, "gateways 206"), device activation unit 210, core networks 212A-212N (collectively, "core networks 212"), backhaul transports 214A-214N (collectively, "backhaul transports 214"), access networks 216A-216N (collectively, "access networks 216"), and IoT devices 218A-218N (collectively, "IoT devices 218").

IoT platforms 202 may each include, for example, a public and/or private cloud, an enterprise, a carrier network, Mobile Virtual Network Operator (MVNO), or the like. IoT platforms 202 may provide IoT devices 218 with applications, analytics, orchestration, data management, application programming interface (API) management, device management, and connection management. For example, IoT platforms 202 may provide access to IoT services such as consumer, industrial, smart city, and/or vehicular services.

IoT customers, e.g., IoT devices 218 may access the IoT services by creating virtual environments and deploying business-specific IoT applications.

Delivery networks 204 may include public internet, Virtual Private Network (VPN) over the public internet, and private interconnect. Delivery networks 204 may provide connectivity between IoT platforms 202 and edge devices 206 of core networks 212.

Edge devices 206 may each comprise a public edge gateway or a private edge gateway. Edge devices 206 may provide connectivity functions, processing, streaming analytics and security, customer segmentation, and interface to IoT platforms 202 and core networks 212. Edge devices 206 are connected via the switch fabric of co-location facilities and the physical and virtual circuits to the data centers including IoT platforms 202.

Core networks 212 may represent core network software deployed within co-location facilities 20. Core networks 212 may include, for example, cellular networks, low power core networks (e.g., LoRaWAN network), or other core networks that control and manage connectivity for access networks 216. Core networks 212 provide aggregation and authentication services to customers (i.e., IoT devices 218) to provide IoT devices 218 with access to IoT platforms 202 connected to core networks 212.

Backhaul transports 214 may connect core networks 212 and access networks 216. Backhaul transports 214 may implement open wireless network, fixed broadband (e.g., T1, cable, Digital Subscriber Line (DSL), Fiber Optic), cellular, and IP/MPLS.

Access networks 216 may include Ethernet, wireless local area networking (e.g., WiFi, 802.11p), local radio frequency (e.g., 6LoWPAN, Zigbee, Bluetooth), LPWAN access networks and cellular/mobile access networks. Access networks 216 that are LPWAN access networks may include non-cellular (e.g., LoRa, SigFox, RPMA) and cellular (e.g., Narrow Band IoT (NB-IoT), LTE-M, extended coverage GSM (EC-GSM)). Access networks 216 that are cellular/mobile access networks may include 5G, 4G, 3G, and 2G networks. Access networks 216 provide connectivity of IoT devices 218 to core networks 212.

IoT devices 218 may include low power devices, mobile devices, or any variety of smart devices. As further described below, IoT devices 218 may send activation requests to DAU 210 for which DAU 210 may activate and automatically onboard the IoT devices 218 into IoT platforms 202.

Device activation unit 210 ("DAU 210") may provide device authentication, interworking, security, and onboarding. For example, DAU 210 may provide supply chain management by interconnecting providers of platforms 202 and device manufacturers such that providers of platforms 202 and device manufacturers may exchange device provisioning and security credential data. DAU 210 may also provide machine interconnection and authentication services to connect IoT devices 218 and IoT platforms 202. To connect IoT devices 218 to IoT platforms 202, DAU 210 may activate IoT devices 218 in core networks 212 and in response to activating IoT devices 218, automatically onboard the authenticated IoT devices 218 by sharing device information of the activated IoT devices 218 to edge devices and/or IoT platforms 202. DAU 210 may also provide encrypted end-to-end communication between IoT devices 218 and IoT platforms 202.

Figure 3:
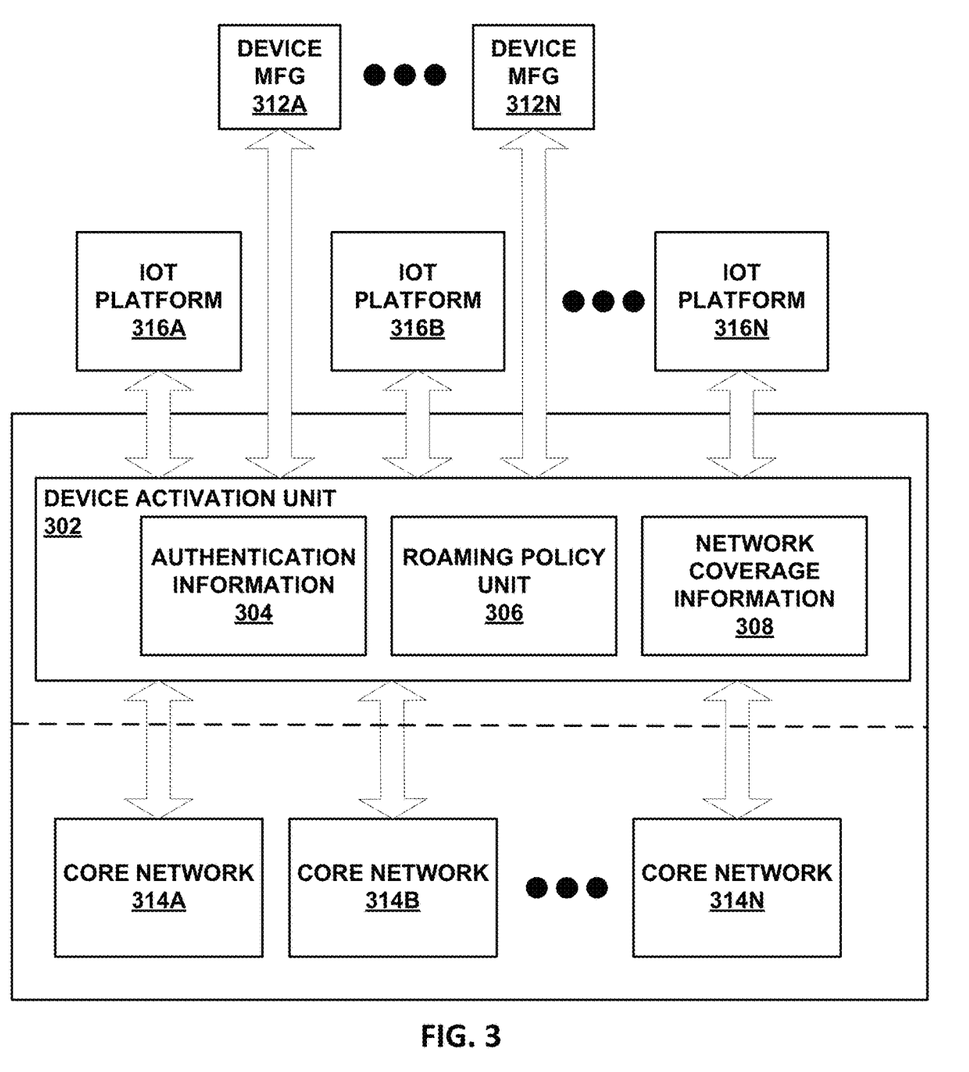
FIG. 3 is a block diagram illustrating an example interconnection of a Device Activation Unit for device supply chain management and device provisioning, in accordance with the techniques described in this disclosure.

FIG. 3 is a block diagram illustrating an example interconnection of a Device Activation Unit for device supply chain management and device provisioning, in accordance with the techniques described in this disclosure. In the example of FIG. 3, device activation unit 302 ("DAU 302") may represent device activation unit 30 of FIGS. 1A, 1B, and device activation unit 210 of FIG. 2. DAU 302 may provide secure data exchange for IoT platforms 316A-316N (collectively, "IoT platforms 316") and device manufacturers 312A-312N (collectively, "device manufacturers 312") for any of core networks 314A-314N (collectively, "core networks 314") and any IoT device. Device manufacturers 312 may include Original Equipment Manufacturers ("OEMs") or any other manufacturer that may produce parts and equipment for accessing IoT platforms 316.

DAU 302 may receive from IoT platforms 316 authentication information 304 that is to be pre-loaded in IoT devices at the time of manufacture. Authentication information 304 may comprise, for example, IoT device identification and master security information, as well as (where applicable, for stationary IoT devices) geographic location information where the device is to be deployed. Assume for example, core network 314A is a low power non-cellular network (e.g., LoRa network). In this example, DAU 302 receives authentication information that may include root security keys ("AppKeys"), device identifiers ("DevEUIs"), and application identifiers ("AppEUIs"). AppKeys are used for activating IoT devices. AppKeys may be assigned by an application owner to the IoT device. AppKeys may be used to derive session keys, e.g., an application session key ("AppSKey") and network session key ("NwkSKey") that are specific for the IoT device to encrypt and verify network communication and application data, as further described below. DevEUI may be a 64-bit end-device identifier that uniquely identifies the IoT device. AppEUI may be a 64-bit application identifier that uniquely identifies an application provider of the IoT device. Although described with respect to authentication information for low power IoT devices and low power networks, authentication information 304 may comprise any type of IoT device identification and master security information for accessing any of core networks 314.

A low power device manufacturer, e.g., device manufacturer 312A, may access the DAU 302 to retrieve authentication information 304 to be loaded in newly manufactured low power non-cellular IoT devices. For example, device manufacturer 312A may provision devices with AppKey, AppEUI, and DevEUI.

When the newly manufactured low power non-cellular IoT devices send activation requests to low power core network 314A, core network 314A may send the activation requests to DAU 302. The activation request may include, for example, AppEUI, DevEUI, and device nonce value. In response, DAU 302 may activate these low power non-cellular IoT devices within core network 314A. For example, DAU 302 may also generate session security keys (e.g., AppSKey and NwkSKey). AppSKey may be used to encrypt or decrypt payload data between an IoT device and an application server. NwkSKey may be used to encrypt MAC commands between the IoT device and network server. DAU 302 may send the generated session keys to core network 314A and IoT platform 316A. DAU 302 may send an activation response including information for which the IoT devices may generate session keys that match the session keys sent to core networks 314A and edge devices. For example, DAU 302 may send an activation response including the NwkSKey and an application nonce value to core network 314A. DAU 302 may also send to an IoT device an activation response including a device identifier and an application nonce value. The IoT device may generate session security keys from the activation response that match the AppKey and NwkSKey generated by DAU 302. By using the session keys, the IoT device may securely communicate with core networks 314A and the IoT edge devices by encrypting a packet using, e.g., NwkSKey to securely access core network 314A, and by encrypting the packet using, e.g., AppSKey, to securely access IoT platform 316A.

DAU 302 may also automatically onboard the activated devices to one or more IoT platforms 316. For example, DAU 302 may update roaming policy unit 306 (RPU 306) in the event IoT devices are activated. In this example, DAU 302 provide information associated with the activated low power non-cellular IoT device to IoT platform 316A and/or the edge device connected to IoT platform 316A to enable integrated device activation in IoT platform 316A when the low power non-cellular device activates on core network 314A.

RPU 306 may instantiate forwarding rules into the switch fabric of the co-location facilities to allow traffic from low power IoT devices to flow through core network 314A and IoT platform 316A. RPU 306 may provide a roaming policy function (RPF).

Alternatively, or additionally, DAU 302 may perform the above for cellular IoT devices. For example, assume for example, core network 314B is a cellular network (e.g., LTE). In this example, DAU 302 receives authentication information (e.g., eSIM) configured for cellular networks (e.g., core network 314B). A cellular device manufacturer, e.g., device manufacturer 312B, may access the DAU 302 to retrieve authentication information 304 to be loaded in newly manufactured cellular IoT devices.

When the newly manufactured cellular IoT devices send activation requests to mobile core network 314B, mobile core network 314B may send the activation requests to DAU 302. In response, DAU 302 may activate these cellular IoT devices within core network 314B.

DAU 302 may also automatically onboard the activated devices to one or more IoT platforms 316. For example, DAU 302 may update RPU 306 in the event IoT devices are activated. In this example, DAU 302 provide information associated with the activated cellular IoT devices to IoT platform 316B and/or the edge device connected to IoT platform 316B to enable integrated device activation in IoT platform 316B when the cellular device activates on core network 314B.

DAU 302 may also include network coverage information 308 to maintain network coverage (e.g., "last mile" coverage) information on a per IoT network provider basis to automatically alert network providers if there is a lack of, or insufficient, network (e.g., wireless) coverage in specific geographic locations causing failures in connectivity or activation of IoT devices (e.g., IoT devices 4 of FIG. 1). To alert network providers, geographic location information (e.g., where a given IoT device needs to be deployed) may be included in the device onboarding/provisioning information along with device and application identification information. In this case, DAU 302 can compare the network coverage information 308 with the requested device location information and determine if there is network coverage in the requested location. If there is no sufficient coverage, DAU 302 may alert one or more network providers and trigger deployment of wireless gateways (e.g., access gateways/points) in order to provide the network coverage. Once the coverage is provided for the initial requesting device, all other IoT devices may access the newly deployed access gateway will be able to use the IoT access network.

Figure 4:
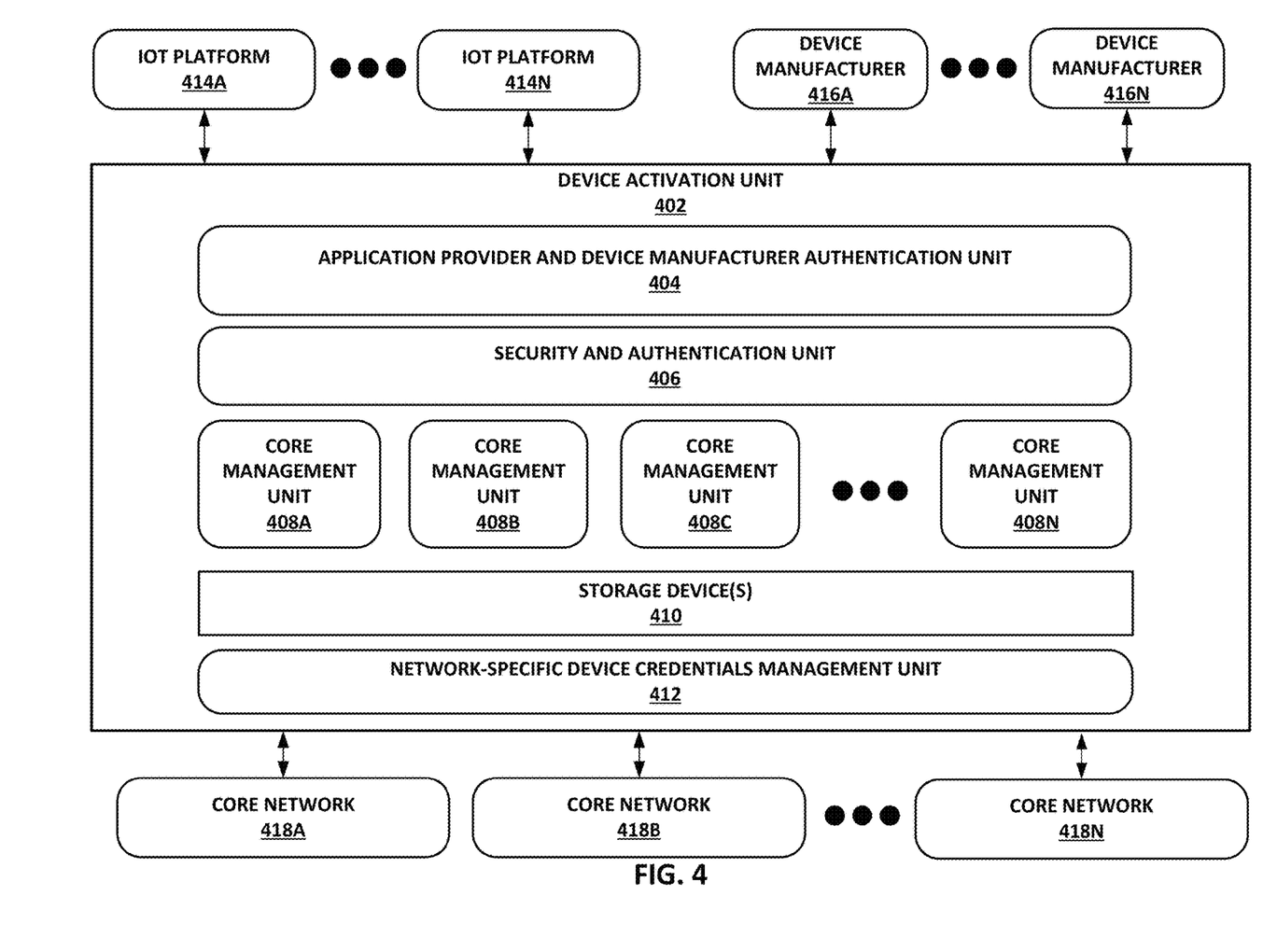
FIG. 4 is a block diagram illustrating an example Device Activation Unit in further detail, in accordance with the techniques described herein.

FIG. 4 is a block diagram illustrating an example Device Activation Unit in further detail, in accordance with the techniques described herein. Device Activation Unit 402 ("DAU 402") may represent Device Activation Unit 30 of FIGS. 1A and 1B, Device Authentication Unit 210 of FIG. 2, and Device Activation Unit 302 of FIG. 3. Although the following example is described with respect to low power IoT devices and low power networks, DAU 402 may be extended for any type of IoT device and network.

DAU 402 includes an application provider and device manufacturer authentication unit 404 ("manufacturer authentication unit 404"), security and authentication unit 406, core management units 408A-408N (collectively, "core management units 408"), one or more storage devices 410, and network-specific device credential management unit 412.

Manufacturer authentication unit 404 may facilitate device supply chain management (as described above in FIG. 3). For example, manufacturer authentication unit 404 of DAU 402 may facilitate interconnection with IoT platforms 414A-414N (collectively, "IoT platforms 414") and device manufacturers 416A-416N (collectively, "device manufacturers 416") such that DAU 404 may receive authentication information from one or more IoT platforms 414 and provide the authentication information for one or more device manufacturers 416 to manufacture IoT devices based on the authentication information. As one example, DAU 402 may receive from IoT platform 414A authentication information such as root security keys ("AppKeys"), device identifiers ("DevEUIs"), and application identifiers ("AppEUIs") for low power devices, and store this information in one or more of storage devices 410.

DAU 402 may also interconnect with device manufacturers 416 such that device manufacturers 416 may access the authentication information stored in one or more storage devices 410 of DAU 402. Continuing the example above, DAU 402 may interconnect with a low power device manufacturer, e.g., device manufacturer 416A, such that the low power IoT device manufacturer 416A may retrieve the AppKeys, DevEUIs, and AppEUIs stored in storage devices 410 and manufacture low power IoT devices based on the authentication information.

Core management units 408 may each manage connection and routing to a respective one of core networks 418. For example, core management units 408 may each perform respective network specific device activation functions. For example, core management unit 408A may provide LoRa activation functions for LoRa (e.g., over-the-air (OTA) activation procedures), core management unit 408B may provide eSIM activation functions for eSIM/Cellular, and so on. In some examples, core management units 408 may each include, or have access to, specific network coverage data. For example, core management units 408 may each use the network coverage data to determine whether there is network coverage in a particular location, and may alert network provider(s) if network coverage is insufficient.

Security and authentication unit 406 ("authentication unit 406") may facilitate activation and authentication of IoT devices (and Blockchain based devices) for access to core networks 418A-418N (collectively, "core networks 418") interconnected to DAU 402. Suppose for example that a low power IoT device manufactured by device manufacturer 416A seeks access to low power core network 418A. The low power IoT device may send an activation request (e.g., via Over-The-Air (OTA) activation procedures, or other activation procedures) to low power core network 418A to request activation within low power core network 418A. In turn, low power core network 418A forwards the activation request to DAU 402.

Authentication unit 406 may share information of the activated IoT device to core network 418A and an edge device coupled to IoT platform 414A to enable integrated device activation in IoT platform 414A when the IoT device activates on core network 418A. In some examples, DAU 402 may include (or connect with) a roaming policy function that may instantiate forwarding rules into the interconnection fabric to allow traffic to flow between the access network and core network 418A, and between core network 418A and the edge device coupled to IoT platform 414A. That is, when an IoT device activates on core network 418A, the IoT device is also activated in IoT platform 414A.

Network-specific device credentials management unit 412 ("management unit 412") may generate a session key used for encrypting messages in a secure communication session (e.g., MQTT session) between the low power IoT device and low power core network 418A. For example, management unit 412 may generate a session key from information included in the activation request, such as an application identifier, device identifier, and nonce value.

Management unit 412 may then send an activation response to core network 418, which in turn forwards the activation response to the low power IoT device. The low power IoT device may generate a session key (e.g., network session key ("NwkSKey") that matches the session key of low power core network 418A and edge device coupled to IoT platform 414A. The low power IoT device may use the session key for forwarding encrypted traffic between the low power IoT device and IoT platform 414A.

Figure 5:
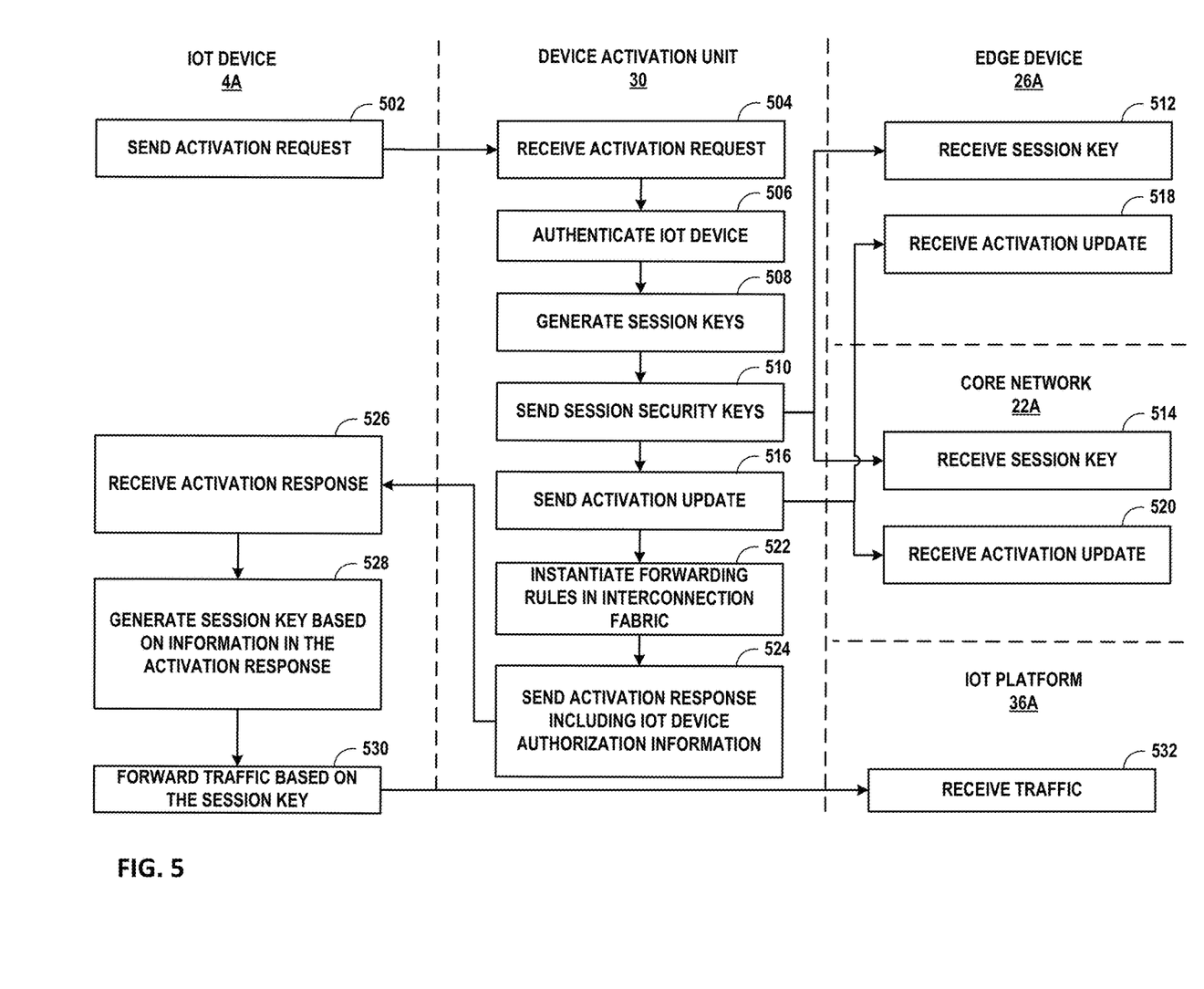
FIG. 5 is a flowchart illustrating example operation of a Device Activation Unit in provisioning an IoT device and establishing secure communication between the IoT device and an IoT edge device, in accordance with techniques described herein.

FIG. 5 is a flowchart illustrating example operation of a Device Activation Unit in provisioning an IoT device and establishing secure communication between the IoT device and an IoT edge device, in accordance with techniques described herein. For ease of illustration, FIG. 5 is described with respect to FIG. 1A and FIG. 3. Although the following is described with respect to low power networks, the techniques described below are also applicable to other IoT network technologies.

The provider for platform 36A may order low power devices configured to access core network 22A. DAU 30 may receive authentication information from providers of platforms 36 for low power devices. For example, DAU 30 may receive authentication information such as root security keys ("AppKeys"), device identifiers ("DevEUIs"), and application identifiers ("AppEUIs"), to activate low power devices within core network 22A. Device manufacturers may retrieve the authentication information from DAU 30 and manufacture low power IoT devices, e.g., IoT device 4A, based on the authentication information.

IoT device 4A sends an activation request to access a low power core network, e.g., core network 22A, co-located in co-location facilities 20 (502). For example, IoT device 4A may initiate Over-The-Air (OTA) activation procedures by turning the device on. In this example, IoT device 4A sends an activation request (e.g., a JOIN request) in accordance with LoRa OTA device activation specification.

Core network 22A within co-location facilities 20 receives the activation request and may forward the activation request to DAU 30. DAU 30 may receive the activation request (504) and authenticate IoT device 4A (506). For example, security and authentication unit 406 of the DAU may initiate activation procedures and authenticate IoT device 4A for accessing core network 22A.

DAU 30 generate session keys for secure end-to-end communication between IoT device 4A and core network 22A (508). For example, network-specific device credentials management unit 412 of the DAU may generate a session key used for encrypting messages in a secure communication session (e.g., MQTT session) between low power IoT device 4A and low power core network 22A. The session key may be generated from information included in the activation request without exposing root keys. IoT device 4A may securely communicate to core network 22A and edge device 26A by encrypting a packet using, e.g., AppSKey, and also encrypting the packet using, e.g., NwkSKey. Access networks may receive the packet for which the network server for core network 22A may decrypt the packet using NwkSKey and the application server for IoT platform 36A may decrypt the packet using AppSKey.

DAU 30 sends the session keys to core network 22A and edge device 26A to establish an end-to-end communication session (510). For example, network-specific device credentials management unit 412 of the DAU may send the session keys to core network 22A and edge device 26A such that encrypted traffic may flow between access network 8 and core network 22A and between core network 22A and edge device 26A.

Edge device 26A receives the session key to enable edge device 26A to send and receive encrypted traffic from core network 22A and IoT platform 36A (512). Similarly, core network 22A receives the session key to enable core network 22A to send and receive encrypted traffic from IoT device 4A and IoT platform 36A (514).

DAU 30 sends an activation update to core network 22A and edge device 26A (516). For example, security and authentication unit 406 of the DAU may send an activation update to core network 22A and edge device 26A to enable integrated device activation in IoT platform 36A when the IoT device 4A is activated on core network 22A. The activation update may include information identifying the activated IoT device, e.g., IoT device 4A. In some examples, DAU 30 may send the activation update directly to IoT platform 36A to activate IoT device 4A in IoT platform 36A.

Edge device 26A receives the activation update and activates IoT device 4A in IoT platform 36A (518). Similarly, core network 22A receives the activation update and activates IoT device 4A in core network 22A (520).

DAU 30 may instantiate forwarding rules into interconnection fabric (522). For example, DAU 30 may include (or interconnect with) roaming policy unit 34 that may install forwarding rules in the interconnection fabric of co-location facilities 20 to allow connections to and from IoT device 4A and gateway 24A and to and from IoT edge 26A.

DAU 30 sends an activation response (e.g., LoRa join accept) to core network 22A, which forwards the activation response to IoT device 4A (524). The activation response may include parameters necessary for IoT device 4A to generate session keys that match the session keys received by edge device 26A and core network 22A.

IoT device 4A receives the activation response (526) and generates, based on the parameters included in the activation response, a session key that matches the session keys received by edge device 26A and core network 22A (528).

IoT device 4A may forward traffic based on the session key (530). In this way, IoT platform 36A may receive secure communication from IoT device 4A (532).

Figure 6:
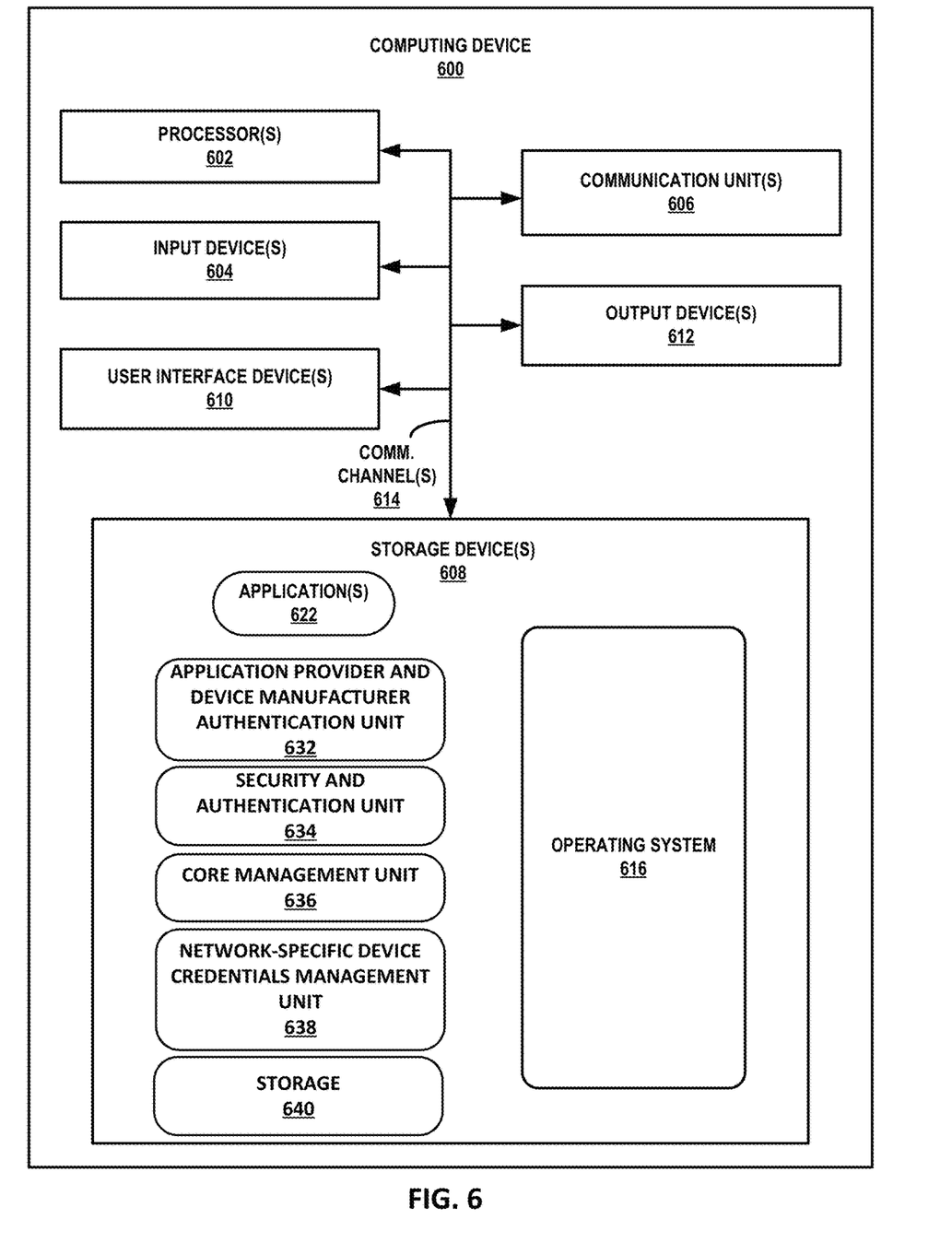
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor(s) 602 for executing a Device Activation Unit 624, or any other computing device described herein. Other examples of computing device 600 may be used in other instances. Computing device 600 may be, for example, Device Activation Unit 30 (FIGS. 1A, 1B), Device Activation Unit 202 (FIG. 2), Device Activation Unit 302 (FIG. 3), or Device Activation Unit 402 (FIG. 4). Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components).

As shown in the example of FIG. 6, computing device 600 includes one or more processors 602, one or more input devices 604, one or more communication units 606, one or more output devices 612, one or more storage devices 608, and user interface (UI) device(s) 610. Computing device 600, in one example, further includes one or more application(s) 622, Device Activation Unit 624, and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. Other examples of such network interfaces may include 3G and WiFi radios. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622 and Device Activation Unit 624 with processors 602, communication unit 606, storage device 608, input device 604, user interface devices 610, and output device 612.

Application provider and device manufacturer authentication unit 632, security and authentication unit 634, core management unit 636, network-specific device credentials management unit 638, and storage 640 may also include program instructions and/or data that are executable by computing device 600 to perform the functions as described herein.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:

1. A method comprising:
   receiving, by a device activation unit of one or more co-location facilities, an activation request message from an Internet of Things (IoT) device to activate the IoT device on an IoT core network of a plurality of IoT core networks, wherein the plurality of IoT core networks and a plurality of IoT edge devices are co-located within the co-location facilities that are deployed and managed by a co-location facilities provider, and wherein the plurality of IoT edge devices are connected to one or more IoT platforms;
   authenticating, by the device activation unit, the IoT device for connection to the IoT core network of the plurality of IoT core networks; and
   in response to authenticating the IoT device, provisioning, by the device activation unit, a connection between the IoT core network of the plurality of IoT core networks and the plurality of IoT edge devices to provide the IoT device access to the one or more IoT platforms via the plurality of IoT edge devices.

2. The method of claim 1, wherein provisioning the connection between the IoT core network of the plurality of IoT core networks and the plurality of IoT edge devices comprises:
   sending an activation update message to the IoT core network of the plurality of IoT core networks and the one or more IoT platforms.

3. The method of claim 1, wherein provisioning the connection between the IoT core network of the plurality of IoT core networks and the plurality of IoT edge devices comprises:
   sending an activation update message to the IoT core network of the plurality of IoT core networks and the plurality of IoT edge devices.

4. The method of claim 1, further comprising:
   generating, by the device activation unit, a first session key for a communication session between the IoT core network of the plurality of IoT core networks and the plurality of IoT edge devices;
   sending, by the device activation unit, the first session key to the plurality of IoT edge devices;
   sending, by the device activation unit, the first session key to the IoT core network of the plurality of IoT core networks; and
   sending, by the device activation unit and to the IoT device, an activation response message usable by the IoT device to generate a second session key for the communication session.

5. The method of claim 4, wherein generating the first session key for the IoT device comprises generating the first session key of the IoT device based on information included in the activation request message, wherein the information includes a device identifier and a security key.

6. The method of claim 1, further comprising:
   receiving, by the device activation unit, authentication information from an IoT platform of the one or more IoT platforms;
   storing, by the device activation unit, the authentication information for access by a device manufacturer to manufacture the IoT device based on the authentication information.

7. The method of claim 6, wherein the authentication information comprises at least one of an application identifier, a device identifier, and application key.

8. The method of claim 1, wherein the IoT core network of the plurality of IoT core networks comprises a first IoT core network, further comprising:
   in response to authenticating a first IoT device, provisioning, by the device activation unit, a connection between a second IoT core network of the plurality of IoT core networks and the plurality of IoT edge devices to provide a second IoT device access to the one or more IoT platforms via the plurality of IoT edge devices.

9. The method of claim 1, wherein the one or more IoT platforms are co-located within the co-location facilities.

10. The method of claim 1,
    wherein the IoT device is a low power IoT device; and
    wherein the IoT core network of the plurality of IoT core networks is a low power IoT core network.

11. A system comprising:
    a plurality of Internet of Things (IoT) edge devices co-located within respective co-location facilities each deployed and managed by a single co-location facility provider, wherein at least one of the plurality of IoT edge devices is communicatively coupled to one or more IoT platforms;
    a plurality of IoT core networks co-located within one or more co-location facilities each deployed and managed by the single co-location facility provider, wherein at least one of the plurality of IoT core networks is communicatively coupled to an IoT device of a plurality of IoT devices;
    a device activation unit, wherein the device activation unit is configured to:
      receive an activation request message from the IoT device to activate the IoT device on an IoT core network of the plurality of IoT core networks;

authenticate the IoT device for connection to the IoT core network of the plurality of IoT core networks; and in response to authenticating the IoT device, provision a connection between the IoT core network of the plurality of IoT core networks and the plurality of IoT edge devices to provide the IoT device access to the one or more IoT platforms via the plurality of IoT edge devices.

12. The system of claim 11, wherein, to provision the connection between the IoT core network of the plurality of IoT core networks and the plurality of IoT edge devices, the device activation unit is further configured to:

send an activation update message to the IoT core network of the plurality of IoT core networks and the one or more IoT platforms.

13. The system of claim 11, wherein, to provision the connection between the IoT core network of the plurality of IoT core networks and the plurality of IoT edge devices, the device activation unit is further configured to:

send an activation update message to the IoT core network of the plurality of IoT core networks and the plurality of IoT edge devices.

14. The system of claim 11, wherein the device activation unit is further configured to:

generate a first session key for a communication session between the IoT core network of the plurality of IoT core networks and the plurality of IoT edge devices;

send the first session key to the plurality of IoT edge devices;

send the first session key to the IoT core network of the plurality of IoT core networks; and send, to the IoT device, an activation response message usable by the IoT device to generate a second session key for the communication session.

15. The system of claim 14, wherein, to generate the first session key for the IoT device, the device activation unit is further configured to:

generate the first session key of the IoT device based on information included in the activation request message.

16. The system of claim 11, wherein the device activation unit is further configured to:

receive authentication information from an IoT platform of the one or more IoT platforms;

store the authentication information for access by a device manufacturer to manufacture the IoT device based on the authentication information.

17. The system of claim 16, wherein the authentication information comprises at least one of an application identifier, a device identifier, and application key.

18. The system of claim 11, wherein the IoT core network of the plurality of IoT core networks comprises a first IoT core network, the device activation unit further configured to:

provision, in response to authenticating a first IoT device, a connection between a second IoT core network of the plurality of IoT core networks and the plurality of IoT edge devices to provide a second IoT device access to the one or more IoT platforms via the plurality of IoT edge devices.

19. The system of claim 11, wherein the one or more IoT platforms are co-located within the co-location facilities.

20. A non-transitory computer-readable storage medium comprising instructions that when executed cause one or more processors of a computing system to:

receive an activation request message from the IoT device to activate an Internet of Things (IoT) device on an IoT core network of the plurality of IoT core networks, authenticate the IoT device for connection to the IoT core network of the plurality of IoT core networks; and in response to authenticating the IoT device, provision a connection between the IoT core network of the plurality of IoT core networks and the plurality of IoT edge devices to provide the IoT device access to the one or more IoT platforms via the plurality of IoT edge devices.

\* \* \* \* \*